United States Patent [19]

Lee et al.

[11] 4,446,335

[45] May 1, 1984

[54] TELEPHONE SIGNAL RECORDING METHODS AND APPARATUS

[75] Inventors: Charles E. Lee, Miller Place, N.Y.; C. Marlon Combs, Claremont, Calif.

[73] Assignee: Dynametric, Inc., Pasadena, Calif.

[21] Appl. No.: 342,253

[22] Filed: Jan. 25, 1982

[51] Int. Cl.[3] .......................................... H04M 11/00
[52] U.S. Cl. .................................... 179/2 C; 179/6.18
[58] Field of Search ................ 179/1 C, 1 PC, 1 MN, 179/2 C, 6.18, 81 E, 178, 6.01

[56] References Cited

U.S. PATENT DOCUMENTS

| | | | |
|---|---|---|---|
| 949,690 | 2/1910 | Thompson | 179/6.18 |
| 2,900,449 | 8/1959 | Lea | 179/6.18 |
| 4,117,266 | 9/1978 | Williams | 179/6.18 |
| 4,191,861 | 3/1980 | Walker, Jr. | 179/81 B |
| 4,317,964 | 3/1982 | Biggs et al. | 179/1 MN X |
| 4,341,926 | 7/1982 | Chester | 179/2 C |
| 4,367,374 | 1/1983 | Serrano | 179/2 C X |

FOREIGN PATENT DOCUMENTS

| | | | |
|---|---|---|---|
| 2539986 | 3/1977 | Fed. Rep. of Germany | 179/1 MN |
| 417915 | 1/1933 | United Kingdom | 179/1 C |

OTHER PUBLICATIONS

*Telephony*, Jul. 3, 1978, p. 8; Code-A-Phone TM Advertisement.

*Primary Examiner*—A. D. Pellinen
*Assistant Examiner*—Keith E. George
*Attorney, Agent, or Firm*—Benoit Law Corporation

[57] ABSTRACT

Disclosed audio signal recording methods and apparatus operate with a telephone set having a housing and a handset connected to a first modular jack in the housing via a handset cord having at an end thereof a first modular plug fitting into the first modular jack. For audio signal tapping purposes, there is provided a second modular plug fitting into the first modular jack, a second modular jack for receiving the first modular plug, and an electrical interconnection of the second modular jack with the second modular plug. The second modular plug is inserted into the first modular jack and the first modular plug into the second modular jack. Audio signals are tapped from the electrical interconnection of the second modular jack with the second modular plug and are recorded.

40 Claims, 2 Drawing Figures

TELEPHONE SIGNAL RECORDING METHODS AND APPARATUS

BACKGROUND OF THE INVENTION

1. Field of the Invention

The subject invention relates to telephone systems, to telephone sets, to telephone set accessories, to methods and apparatus for tapping audio signals at telephone sets, and to methods and apparatus for amplifying, recording, processing or otherwise utilizing telephone audio signals. The term "audio signal" as herein employed is not intended to be limited to signals intended to be heard by a telephone user, but is intended to be broad enough to extend to signals as transmitted over the phone for data processing, facsimile, transcribing, computer operating and similar purposes.

2. Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

In the evolution of technology, it is a frequently observed fact that certain fields or branches become stagnant because of a pervading inability of otherwise skilled persons throughout the particular field to rise above one or more entrenched prior-art approaches which may have been initially justified against the background of certain equipment, but which became a barrier to progress and were thus unable to keep up with an evolution of that equipment. The background of the subject invention presents such an instance of prior-art stagnation, as will become apparent in the further course of this disclosure.

By way of background, there are many reasons for deriving or tapping an audio signal from a telephone set. For instance, when calling a person's office, it would frequently be desirable to leave a short personal recorded message with his or her secretary or receptionist. Recording of phone messages at order or sales desks is also generally desirable. Telephone signal amplifiers or speaker phones also require a tapped audio signal for their operation. The wide proliferation of facsimile, transcribing, data processing, computer and similar systems operating via telephone lines and sets also call for an electrical audio signal tapping technique that is superior to the now frequently used acoustical coupling over the handset or to other prior-art methods.

Other examples include emergency phone recording, such as by police stations and fire departments, and law enforcement surveillance and authorized wiretapping.

Many telephone recording or signal tapping systems have been developed in the past. Complexities range from large voice-activated systems, with special date and time logging, to small electronic boxes, typically sold at hobby stores, which plug into the phone line and employ a separate cassette recorder, frequently activated by an ON/OFF switch.

One type of prior-art approach makes the signal tapping connection directly to the telephone line pair. In practice, this entails several disadvantages. For one thing, any recorder or other apparatus connected to the wiretap inevitably will be exposed to the large difference in audio levels occurring when signals are transmitted from a nearby station or via line amplifiers in one instant and from a more remote station in another. In an effort to prevent a weak signal from being masked or lost and a strong signal from being distorted, automatic level control circuitry has been tried. This, however, inevitably increases the cost of the system and precludes the use of a readily available typical cassette recorder, inasmuch as automatic level control circuitry would have to be of considerable sophistication to start with.

Moreover, an audio signal tapping device that operates directly from the phone line inevitably becomes inadequate with the many multi-line or key-button phones increasingly used in offices and businesses where the demand for a speaker phone system, phone message recorder and data transmission generally is strongest.

Tapping approaches which would invade the internal wiring system of the telephone set are also disfavored, not only by the telephone company, but also by public agencies charged with assuring a safe operation of the telephone system. Accordingly, equipment which requires connection inside the telephone set was traditionally reserved to installation by the phone company. In practice, this had the disadvantage of an inherent limitation to the type of equipment which the phone company chose to carry. Equally seriously, use of such equipment typically entailed an extra charge on the monthly phone bill with practically no amortization. Thus, it was and still is not unusual that phone subscriber using equipment that would have been amortized by the monthly extra charge in less than a year, nevertheless had and have to keep paying such charge for years, as long as they are using the particular equipment.

In recent years, it has become possible to connect to phone systems certain purchased equipment. However, this too has its problems. For one thing, the phone company has to be notified for an installation of a jack or other suitable means of connection to the internal wiring of the telephone. The phone company installer thereby goes by the phone company's own book. In cases where a discrepancy develops between that book and the specifications of the manufacturer of the particular equipment, the subscriber is frequently left dangling, with the phone company pointing to the manufacturer, and the manufacturer pointing to the phone company. This is also apt to happen if there is some defect in the equipment, with the manufacturer blaming the phone company installer instead.

Against this background of prior-art frustration, various telephone signal pickup devices have enjoyed a certain popularity, until they became frustrated themselves. For instance, inductive pickups have been sold for placement under the telephone, or in a similar position intended to bring about inductive coupling to the telephone ringer coils. Another type of gadget was a suction cup device stuck to the handset for sonic coupling thereto. None of these devices allowed clear recording or high-quality tapping of an audio signal.

Major drawbacks were a typically poor coupling and a susceptibility to interference signals.

The death knell for the inductive coupler finally was tolled when the phone company introduced electronic ringing devices that lacked the traditional inductive ringer coils, so that there was nothing for the inductive coupler to pick up.

SUMMARY OF THE INVENTION

It is a general object of this invention to overcome the disadvantages and to meet the needs expressed or implicit in the above disclosure statement or in other parts hereof.

It is a germane object to provide improved methods and apparatus for tapping an audio signal at a telephone set.

It is a related object of this invention to provide inexpensive but highly effective telephone audio signal tapping devices that may be connected by practically anybody without telephone company participation or tools and that, nevertheless, meet highest requirements, being usable with multi-line phones as well as with single-line phone stations, and being practically immune to the typical signal level variations occurring in telephone lines.

Other objects of the invention include a provision of improved telephone signal amplifying and recording systems, and of improved telephone line facsimile transmission, transcribing and data processing systems.

It is also an object of this invention to provide improved systems of the type herein disclosed which are automatically actuated and deactivated in response to manipulation of the handset and which are operable in different switchable modes.

Other objects of the subject invention will become apparent in the further course of this disclosure.

The subject invention resides in methods and apparatus for recording an audio signal at a telephone set having a housing and a handset connected to a first modular jack in the housing via a handset cord having at an end thereof a first modular plug fitting into the first modular jack. The invention in this respect comprises, in combination, the steps of, or means for, providing a second modular plug fitting into the first modular jack, providing a second modular jack for receiving the first modular plug, and providing an electrical connection of the second modular jack with the second modular plug. The second modular plug is inserted into the first modular jack and the first modular plug is inserted into the second modular jack, the audio signal is tapped from the electrical interconnection of the second modular jack with the second modular plug and the tapped audio signal is recorded.

Other aspects and features of the invention will become apparent in the further course of this disclosure, and no limitation to any aspect, combination or feature is intended by the subject summary of the invention.

BRIEF DESCRIPTION OF THE DRAWINGS

The subject invention and its various aspects and objects will become apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
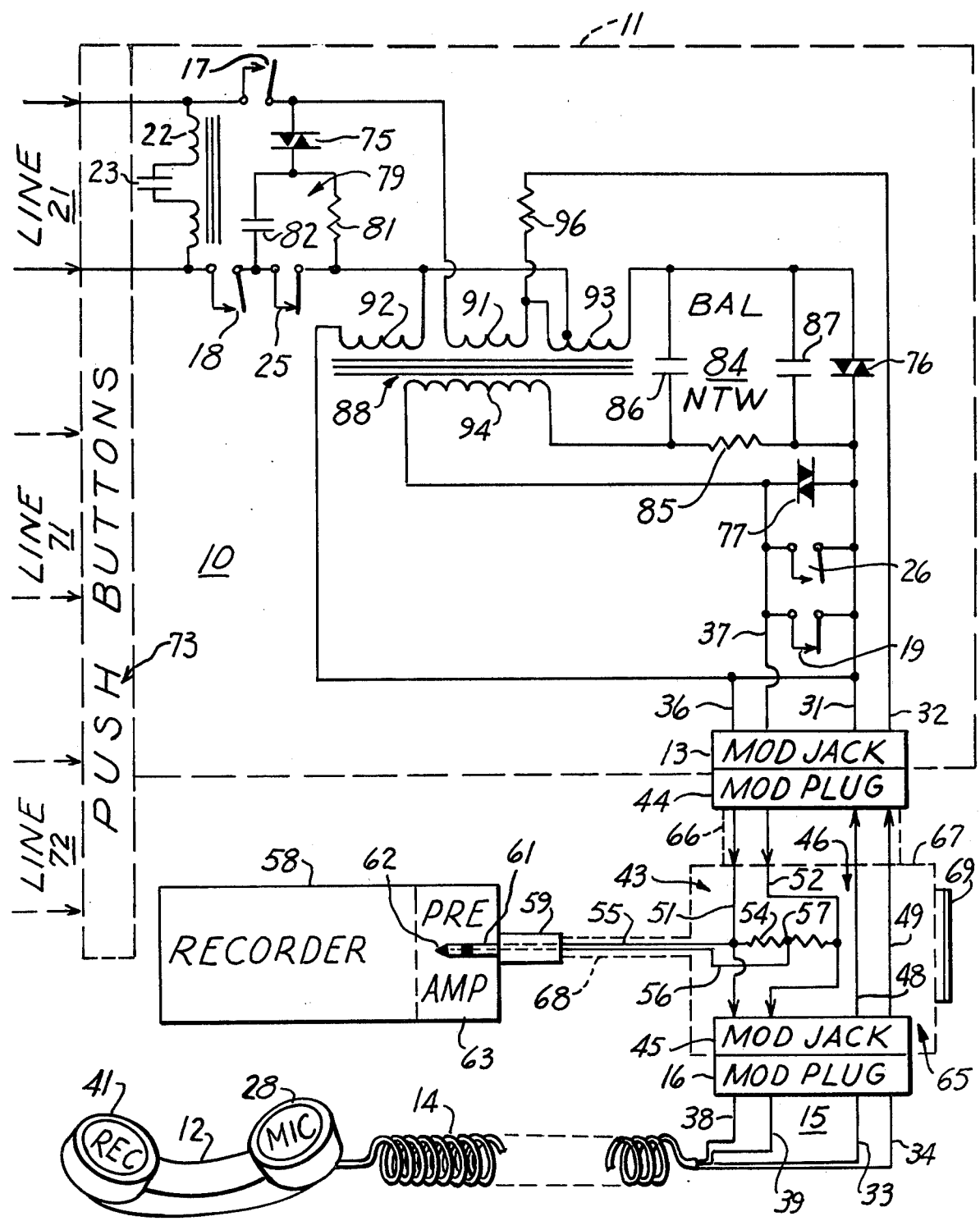
FIG. 1 is a circuit and block diagram of a telephone set and audio signal tapping and recording means and methods according to a first embodiment of the subject invention.

By way of example, the telephone set 10 diagrammatically shown in FIG. 1 is of a type having a housing 11 and a handset 12 connected to a first modular jack 13 in the housing 11 via a handset cord 14 having at an end 15 thereof a first modular plug 16 fitting into the first modular jack 13. Modular jacks and plugs are well known as such, having been introduced and being now widely used by the phone company as handy devices assuring a secure releasably retained connection that is, however, easily made and broken by manipulation of a locking tab without the need for a tool. Modular jacks (not shown) are now also frequently used for connecting telephone sets to phone lines.

In normal operation, the modular plug 16 of the handset cord 14 is inserted into, and releasably retained in, the modular jack 13 of the telephone set 10. Normally, the headset 12 hangs on a hook or rests on a cradle designed to open a pair of so-called hook switches 17 and 18 while closing a third hook switch 19.

In their illustrated open position, the hook switches 17 and 18 disconnect the telephone set 10 from the line 21, except for the ringer coils 22 and direct-current-blocking capacitor 23, or equivalent coil-less electronic ringing device. Accordingly, an alternating or ringing current proceeding over line 21 will cause the ringer 22 to operate, without affecting the remainder of the telephone set circuitry.

On the other hand, when the handset 12 is lifted off its hook or cradle, the hook switch pair 17 and 18 closes, while the third hook switch 19 opens. Conventional direct-current supply equipment in the telephone exchange (not shown) automatically responds to this condition, supplying over line 21 a direct current to the telephone set 10 for its operation. For instance, a contact 25 may be pulsed by an automatic dial for sending pulses to the telephone exchange via line 21, indicating a desired connection to another telephone subscriber. During automatic dialing, a normally open contact 26 is closed in order to prevent dialing pulses from reaching the handset 12.

The subject invention and its embodiments not only are readily operable with the more traditional rotary dialing equipment which emits pules over the phone line, but also without modification with the more modern tone dialing devices that communicate their dialing message by means of various tone combinations. This is a distinct advantage of the equipment according to the subject invention, since existing audio signal tapping devices which require an invasion of the telephone set wiring system typically demand different connection schemes for rotary dialers and tone dialing devices, thereby raising the probability of confusion and faulty connection.

By way of summary, if the handset 12 is removed from its hook or cradle in response to ringing at 22, the telephone exchange supplies a direct-current energization for operation of the telephone set 10. On the other hand, if the handset 12 is removed from its hook or cradle for the purpose of reaching another subscriber, the telephone exchange supplies a dial tone indicating to the subscriber that the equipment is ready, and also supplies the direct-current energization for operation of the telephone set 10.

In either case, the direct-current supply energizes a transmitter or microphone 28 in the handset 12 via a pair of wires 31 and 32, first modular jack 13, and, in conventional operation, modular plug 16 inserted into the modular jack 13, and pair of wires 33 and 34. Electric audio-frequency or audio signals proceeding from another subscriber or from the telephone exchange via line 21 to the telephone set 10 further proceed through a pair of wires 36 and 37, the modular jack 13, the modular plug 16 and a pair of wires 38 and 39 in the handset cord 14 to a receiver 41 in the handset 12.

The person using the illustrated telephone set 10 is thus able to communicate bidirectionally with another party via first modular plug 16 inserted into first modular jack 13 at the housing 11 of the telephone set.

The audio signal tapping method according to the subject invention provides, or the audio signal tapping apparatus 43 according to the preferred embodiment shown in FIG. 1 has, a second modular plug 44 fitting into the first modular jack 13 in the telephone housing 11, a second modular jack 45 for receiving the first modular plug 16 of the handset cord 14, and an electrical interconnection 46 of the second modular jack 45 with the second modular plug 44. In the illustrated preferred embodiments, the mentioned electrical interconnection includes a pair of wires 48 and 49 for connecting the handset microphone wires 33 and 34 to the telephone set microphone wires 31 and 32 and a pair of wires 51 and 52 for connecting the handset receiver wires 38 and 39 to the telephone set receiver wires 36 and 37.

In the practice of the subject invention, the second modular plug 44 is inserted into the first modular jack 13, and the first modular plug 16 is inserted into the second modular jack 45, for a connection of the handset 12 to the internal circuitry of the telephone set 10 via handset cord 14 and tapping device 43.

The subject invention taps the audio signal from the electrical interconnection 46 of the second modular jack 45 with the second modular plug 44. In the illustrated preferred embodiments, the audio signal is particularly tapped from the earphone or receiver wires 51 and 52. In this process, the tapped audio signal may be sujected to a transformation or voltage division.

For instance, a voltage divider 54 may be connected between the earphone or receiver wires 51 and 52. The tapped audio signal may then be derived by a wire 55 from one of the wires 51 and 52 and by a wire 56 from a tap 57.

The wires 55 and 56 may connect to the electrical interconnection 46 an apparatus 58 for utilizing the tapped audio signal. By way of example, a plug 59 compatible with an audio signal input plug of the apparatus 58 may be employed for this purpose. The shell 61 of the plug 59 may be connected to the wire 55, and the tip 62 of that plug to the wire 56.

The apparatus 58 may, for example, be an apparatus for recording the tapped audio signal, such as a tape cassette recorder. Such recorder typically has a preamplifier 63 for amplifying the tapped audio signal. It should, however, be understood that the utility of the subject invention is not limited to recording the tapped audio signal, but may extend to, or include, its amplification in such context as a speaker phone, facsimile transmitting apparatus, word or data processor, or other applications of a transmitted audio signal.

According to a preferred embodiment of the subject invention, the second modular jack 45, the second modular plug 44 and the electrical interconnection 46 are unified into an integral unit 65. To this end, the microphone and earpiece wires 48, 49, 51 and 52 may partially be contained in a cable 66 running from the second modular plug 44 into a housing 67 which contains the remainder of the electrical interconnection 46, as well as the modular jack 45 and the voltage divider or tapping means 54. The wires 55 and 56 may also be contained in a cable 68 proceeding from the housing 67.

The tapping device 43 thus is a self-contained unit which may readily be connected to the telephone by any user thereof. A mounting clip 69 or similar device requiring preferably no tools for its operation, may be employed for releasably attaching the integral unit 65 or housing 67 to the telephone set. For instance, a device 69 in the nature of a money clip may be employed for attaching the housing 67 to the housing of the telephone, such as by sliding the clip 69 with attached housing 67 onto a portion of the wall of the telephone set housing 11 from a free end thereof. In practice, various clip designs are feasible which adapt themselves to the housings 11 and 67 or to backplates thereof.

As one of its major advantages, the subject invention, by concentrating on the receiver cord modular jacks and plugs 13 and 16, elegantly avoids the above mentioned prior-art problem encountered with multi-line or key push button phones. For instance, if the telephone set is of a business type, having several incoming lines 21, 71 and 72, there is no problem, since the subject invention exploits the line selection or push button facility 73 of the telephone set for automatically applying the correct incoming line to the audio signal tapping device 43.

For essentially the same reason, the subject invention also elegantly overcomes the major problem of audio signal level discrepancy, which has plagued at least the less expensive prior-art tapping devices.

In particular, by judiciously operating between the receiver cord modular jack 13 and modular plug 16, the subject invention takes advantage of the telephone set's signal level control and balancing facilities.

In this respect it may be noted that the telephone set 10 includes varistors 75, 76 and 77. These are non-linear semiconductive resistors which in a conventional manner vary their resistance to an electric current in dependence on the current's level or voltage, providing a higher resistance to current flow at low signal levels and a higher conductance at high signal levels. In this manner, a varistor is capable of assuring an essentially constant signal level.

The varistor 75 is in series with a dial pulse filter 79 composed of a parallel-connected resistor 81 and capacitor 82 for suppressing high-frequency interference from the dial pulse contactor 25 to nearby radio receivers.

Varistors 75 and 76 assure an essentially constant or highly regulated audio signal level for the receiver 41, even though the audio signal as received over line 21 or over the other lines is typically subject to considerable level variations.

The varistor 77 is in effect connected across the receiver wires 36 and 37, thereby assisting the switch 26 in suppressing dial pulse clicks in the receiver, and thereby also performing a certain signal level regulatory function.

The varistor 76 is part of a balancing network 84 including a resistor 85 and capacitors 86 and 87 in a π-filter connection. A transformer 88 or so-called induction coil cooperates with the π-filter and varistor 76 in providing a hybrid transformer and balancing network enabling full duplex operation over the two-wire circuit including line 21 or any of the other lines 71 and 72, for instance. The balancing network thus provides automatic balancing between local voice and distant voice.

The transformer 88 has several windings 91, 92, 93 and 94 mutually coupled by a transformer core. One of the wires of the incoming line is connected via hook switch 17 to one end of the transformer coil 91, while the other wire of the pair is connected via hook switch 18 and normally closed dial pulse contactor 25 to one end of the coil 92 and a tap of the coil 93. The other end of the coil 91 and one end of the coil 93 are connected via a resistor 96 to one of the microphone wires 32. The other end of the coil 92 is connected to microphone and receiver wires 31 and 36, while one end of the coil 94 is connected to the other receiver wire 37. The remaining ends of the coils 93 and 94 are separately connected to the π-filter of the balancing network 84.

The illustrated preferred embodiment of the invention thus applies to the tapped audio signal via the first modular jack 13, second modular plug 44 and electrical interconnection 46, a balancing operation effected in the telephone set 10 for balancing a level of the audio signal emanating from an audio transmitter 28 located in the handset 12 and a level of the audio signal emanating from an audio transmitter remote from the telephone set.

In other words, a balancing network 84 in the telephone set 10 effects the balancing function just mentioned, with the first modular jack 13, second modular plug 44 and electrical interconnection 46 constituting a means for connecting the tapping means 54 to 56 to the balancing network 84. The tapped audio signal is thus automatically balanced in the illustrated preferred embodiment of the subject invention.

Preferably, the audio signal tapping means, such as the voltage divider 54, are matched to the balancing network 84 so as to assure proper operation thereof.

The illustrated preferred embodiment also applies to the tapped audio signal via the first modular jack 13, second modular plug 44 and electrical interconnection 46, a constant signal level control effected in the telephone set for equalizing a level of the audio signal emanating from a local audio transmitter and a level of the audio signal emanating from a remote audio transmitter.

In other words, the telephone set includes non-linear resistors or varistors 75 to 77 for equalizing a level of the audio signal as just mentioned, with the first modular jack 13, second modular plug 44 and electrical interconnection 46 constituting a means for connecting the tapping means 54 to 56 to the varistor means 75 to 77.

Again, the audio signal tapping means and load are preferably matched to the level equalizing means or control in the telephone set 10.

The subject invention thus solves all the above mentioned major prior-art problems in an elegant and relatively inexpensive manner.

The tapping device 43 may thus be used as an inexpensive and convenient telephone recording patch or as a tapping device for any of the many purposes therein disclosed. The same applies to the improved audio signal tapping device 100 according to the further preferred embodiment of the subject invention illustrated in FIG. 2. In this respect, like reference numerals as between FIGS. 1 and 2 designate like or functionally equivalent parts, and FIG. 1 and its above description should be consulted for a fuller understanding of the nature and operation of such parts in the tapping device 100 of FIG. 2.

The advanced tapping device 100 takes advantage of a provision, in the electrical interconnection 46, of an electric signal indicative of a removal of the handset 12 from the housing 11 or cradle switch or hook of the telephone set 10. In principle, that electric signal may be derived from the direct current energization supplied by the telephone exchange via the subscriber line when the handset 12 is picked up.

Figure 2:
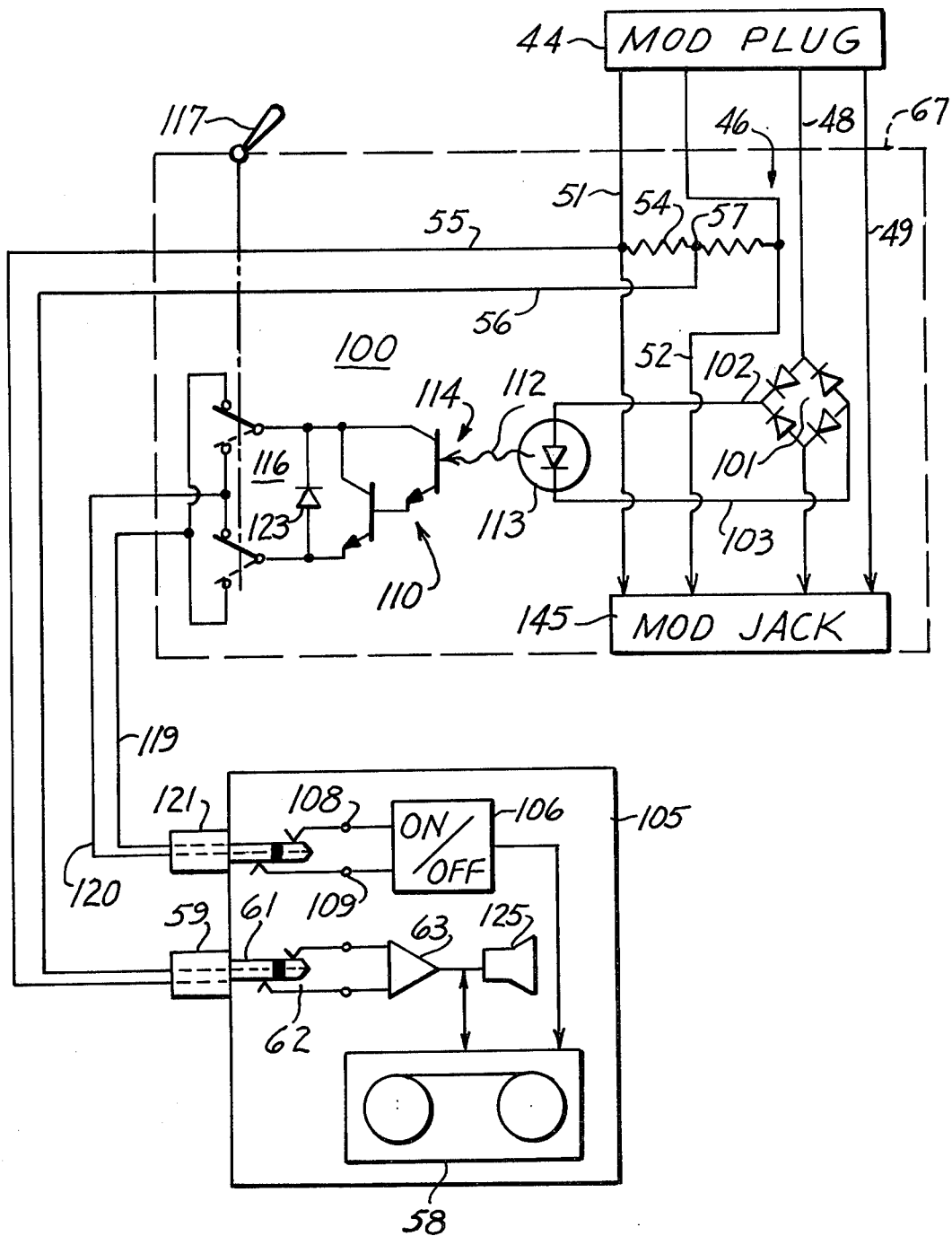
FIG. 2 is a diagram of an advanced audio signal tapping apparatus and method according to a further embodiment of the subject invention, together with a block diagram of tapped signal recording equipment.

In particular, the preferred embodiment shown in FIG. 2 provides a full-wave rectifier 101 in the microphone wire 48, thereby supplying in the rectifier output wires 102 and 103 a unidirectional electric signal of a certain polarity irrespective of the polarity of the direct-current energization supplied by the phone exchange.

As before, an apparatus 105 for utilizing the tapped audio signal is connected to the electrical interconnection 46, such as a via wires 55 and 56 and plug 59. This time, such utilizing apparatus 105 is actuated in response to the electric signal, occurring in leads 102 and 103 and being indicative of a removal of the handset from the housing. To this end, and according to the preferred embodiment illustrated in FIG. 2, a remote control 106 is provided in the utilizing apparatus 105 for selectively actuating such utilizing apparatus. Such remote controls are, for instance, conventional with many commercially available tape recorders which come with a remote control jack. There also is provided an electric current for selectively actuating the remote control 106. Typically, such electric current is provided by the remote control 106 itself, so that the particular recorder may be conveniently actuated by a remote ON/OFF switch connected to the recorder by a cable.

In the preferred embodiment shown in FIG. 2, the recorder remote control is, however, not actuated by a mere remote ON/OFF switch. Rather, the preferred embodiment shown in FIG. 2 employs the electric signal indicative of a removal of the handset 12 for closing an electric circuit for the electric current for selectively actuating the remote control. In practice, such electric current, provided by the remote control 106 and occurring at terminals 108 and 109, typically is unidirectional, having a polarity as determined by the designer of the recorder 105.

As more fully described below, the device 100 controls the unidirectional electric current from the remote control 106 with a semiconductive electric current conducting device 110, while controlling such semiconductive device 110 with the electric signal from the leads 102 and 103 indicative of a removal of the handset 12 from its hook or cradle.

According to an embodiment of the subject invention, there is provided a luminous signal 112 indicative of a removal of the handset 12 from the housing 11, hook or cradle, and the utilizing apparatus 105 is then actuated in response to such luminous signal 112. In particular, the luminous signal 112 may be employed for closing an electric circuit for the electric current for selectively actuating the remote control 106, as will become more fully apparent in the further course of this disclosure.

Again according to FIG. 2, a light-emitting diode (LED) 113 is employed for providing the luminous signal 112. In principle, other means may, however, be employed, such as a fiber optics cable running from the device 100 to the handset 12 so as to be exposed to illumination when the handset is picked up.

By way of example, an optocoupler 114 may be employed as a solid-state switch to start and stop the recorder or other audio signal utilizing apparatus 105. Again by way of example, the optocoupler 114 may be of a type TIL 119, as, for instance described on pages 129 to 132 of the *Texas Instruments Optoelectronics Databook* (3rd ed., 1976). The LED 113 may thus be a gallium arsenide diode which, when energized by the handset-removal indicative signal through leads 102 and 103, emits infrared radiation 112 to an NPN Darlington-connected phototransistor 110.

In this manner, the transistor 110 will selectively make and break a circuit for the energizing current supplied by the remote control 106, whereby the apparatus 105 is turned on for a recording of the tapped audio signal in response to a pickup of the handset 12.

Since the polarity of the remote control energizing current at the terminals 108 and 109 depends on the designer of the apparatus 105, the tapping device 100 has a double-throw switch 116 at and connected to the semiconductive device 110 for selectively reversing the polarity of the unidirectional electric current supplied by the remote control 106 and occurring at the semiconductive device 110. The preferred embodiment shown in FIG. 2 unifies the second modular jack 45, second modular plug 44, electricaly interconnection 46 and semiconductive device or optocoupler 114 into an integral unit, which may be releasably attached to the housing 11 of the telephone set 10. As shown in FIG. 2, such integral unit preferably includes the switch 116 therein. For instance, the previously mentioned housing 67 may be employed to contain also the full wave rectifier 101, optocoupler 114 and polarity reversal switch 116 in addition to the modular jack 45 and tapping means 54. The switch 116 preferably is made manually actuable at the housing 67, such as by means of a projecting toggle lever 117, or other manually engageable device.

The contacts of the switch 116 are paired as shown in FIG. 2, and the resulting contact pairs are connected by leads 119 and 120, respectively, and a further plug 121 to the remote control terminals 108 and 109.

If in a remote control 106 of a particular design the actuating electric current has negative polarity at the terminal 108 and positive polarity at the terminal 109, then the semiconductive device 110 is capable of switching the remote control 106 in the solidly illustrated position of the switch 116 in response to manipulation of the handset 12. In particular, the semiconductive device 110 closes a circuit of the remote control energizing current via leads 119 and 120, effecting thereby a turning on of the apparatus 105 in response to an electric signal in leads 102 and 103 and a luminous signal at 112 indicative of a removal of the handset 12 from the telephone apparatus. Conversely, the semiconductive device 110 interrupts the circuit for the remote control energizing current supplied by the component 106, when a cessation of the electric signal at 102 and 103 and of the luminous signal at 112 indicates that the handset 12 has been replaced on its hook or cradle. The audio signal recorder 58 is thus automatically turned on and off in response to normal manipulation of the handset 12.

The same automatic operation may be provided even if the polarity of the remote control operating signal provided by the component 106 is positive at the terminal 108 and negative at the terminal 109. In that case, the switch 116 is manually actuated to its second position indicated in FIG. 2 by dotted lines.

As a particularly advantageous feature of the preferred embodiment shown in FIG. 2, which may be employed additionally to the function of the switch 116 so far described, or which may be employed alternatively thereto, the tapping device unidirectionally conducts the unidirectional electric current provided by the remote control 106 past the semiconductive device 110 for selectively deactivating a control of the semiconductive device with the electrical signal indicative of a removal of the handset 12. By way of example, the preferred embodiment illustrated in FIG. 2 connects a diode 123 across the output of the semiconductive device 110.

Accordingly, if, for a given polarity of the remote control energizing signal, the system automatically responds in the solidly illustrated position of the switch 116 to manipulation of the handset 12, then such automatic response may readily be inhibited or suspended by actuation of the switch 116 to its second position indicated by dotted lines. In that case, the diode 123 effectively bypasses the switching function of the semiconductive device 110, rendering the same ineffective until the switch 116 is restored to its solidly illustrated position.

Again, the feature under consideration is insensitive to the inherent polarity of the remote control energizing current. For instance, if such current as supplied by the component 106 were positive at the terminal 108 and negative at the terminal 109, the semiconductive device 110 would be bypassed by the diode 123 and thereby rendered ineffective in the solidly illustrated position of the switch 116. On the other hand, the switching function by the semiconductive device 110 would be restored for automatic operation of the apparatus 105 in response to manipulation of the handset 12, if the switch were then actuated to its second position indicated by dotted lines in FIG. 2.

It may thus be recognized that the tapping device 100, which may be fully implemented within a space of as little as a cubic inch or even less, constitutes a highly versatile piece of equipment that augments the many advantages of the simpler device 43 shown in FIG. 1.

As mentioned above, the tapped audio signal received through the plug 59 may be employed for a wide variety of purposes, including amplification at 63 for recording at 58, or for word or data processing, transcribing or facsimile transmission, to name a few examples. Also, the tapped audio signal may be rendered audible, such as by a loud-speaker 125, either upon receipt or upon playback thereof after recording.

The subject extensive disclosure suggests or renders apparent to those skilled in the art various modifications and variations within the spirit and scope of the subject invention or within equivalents thereof.

We claim:
1. A method of recording an audio signal at a telephone set having a housing and a handset connected to a first modular jack in said housing via a handset cord having at an end thereof a first modular plug fitting into said first modular jack, comprising in combination the steps of:

providing a second modular plug fitting into said first modular jack;

providing a second modular jack for receiving said first modular plug;

providing an electrical interconnection of said second modular jack with said second modular plug;

inserting said second modular plug into said first modular jack and said first modular plug into said second modular jack;

tapping said audio signal from said electrical interconnection of said second modular jack with said second modular plug; and recording said tapped audio signal.

2. A method as claimed in claim 1, wherein:

said tapping includes the step of subjecting said audio signal to a voltage division.

3. A method as claimed in claim 1, including the step of:

amplifying said tapped audio signal.

4. A method as claimed in claim 1, including the steps of:

providing in said electrical interconnection an electric signal indicative of a removal of said handset from said housing;

connecting to said electrical interconnection an apparatus for recording said tapped audio signal; and actuating said recording apparatus in response to said electric signal.

5. A method as claimed in claim 1, including the steps of:

providing in said electrical interconnection an electric signal indicative of a removal of said handset from said housing;

connecting to said electrical interconnection an apparatus for recording said tapped audio signal;

providing in said recording apparatus a remote control for selectively actuating said recording apparatus;

providing an electric current for selectively actuating said remote control; and employing said electric signal indicative of a removal of said handset for closing an electric circuit for said electric current for selectively actuating said remote control.

6. A method as claimed in claim 1, 4 or 5, including the step of:

unifying said second modular jack, second modular plug and electrical interconnection into an integral unit.

7. A method as claimed in claim 6, including the step of:

releasably attaching said integral unit to said housing.

8. A method as claimed in claim 6, including the step of:

releasably attaching said integral unit to said housing at said first modular jack.

9. A method as claimed in claim 5, including the steps of:

providing said electric current for selectively actuating said remote control as a unidirectional electric current;

controlling said unidirectional electric current with a semiconductive electric current conducting device; and controlling said semiconductive device with said electric signal indicative of a removal of said handset.

10. A method as claimed in claim 9, including the steps of:

selectively reversing the polarity of said unidirectional electric current at said semiconductive device.

11. A method as claimed in claim 9 or 10, including the step of:

unidirectionally conducting said unidirectional electric current past said semiconductive device for selectively deactivating a control of said semiconductive device with said electric signal indicative of a removal of said handset.

12. A method as claimed in claim 1, including the steps of:

providing a luminous signal indicative of a removal of said handset from said housing;

connecting to said electrical interconnection an apparatus for recording said tapped audio signal; and actuating said recording apparatus in response to said luminous signal.

13. A method as claimed in claim 1, including the steps of:

providing a luminous signal indicative of a removal of said handset from said housing;

connecting to said electrical interconnection an apparatus for recording said tapped audio signal;

providing in said recording apparatus a remote control for selectively actuating said recording apparatus;

providing an electric current for selectively actuating said remote control; and employing said luminous signal indicative of a removal of said handset for closing an electric circuit for said electric current for selectively actuating said remote control.

14. A method as claimed in claim 13, including the steps of:

providing said electric current for selectively actuating said remote control as a unidirectional electric current;

controlling said unidirectional electric current with an electrooptical semiconductive electric current conducting device; and controlling said electrooptical semiconductive device with said luminous signal indicative of a removal of said handset.

15. A method as claimed in claim 14, including the step of:

selectively reversing the polarity of said unidirectional electric current at said semiconductive device.

16. A method as claimed in claim 14 or 15, including the step of:

unidirectionally conducting said unidirectional electric current past said semiconductive device for selectively deactivating a control of said semiconductive device by said luminous signal indicative of a removal of said handset.

17. A method as claimed in claim 9 or 14, including the step of:

unifying said second modular jack, second modular plug, electrical interconnection and semiconductive device into an integral unit.

18. A method as claimed in claim 17, including the step of:

releasably attaching said integral unit to said housing.

19. A method as claimed in claim 1, 4 or 12, including the steps of:
applying to said tapped audio signal via said first modular jack, second modular plug and electrical interconnection a balancing operation effected in said telephone set for balancing a level of said audio signal emanating from an audio transmitter located in said handset and a level of said audio signal emanating from an audio transmitter remote from said telephone set.

20. A method as claimed in claim 1, 4 or 12, including the steps of:
applying to said tapped audio signal via said first modular jack, second modular plug and electrical interconnection a constant signal level control effected in said telephone set for equalizing a level of said audio signal emanating from a local audio transmitter and a level of said audio signal emanating from a remote audio transmitter.

21. Apparatus for recording an audio signal at a telephone set having a housing and a handset connected to a first modular jack in said housing via a handset cord having at an end thereof a first modular plug fitted into said first modular jack, comprising in combination:
a second modular plug fitting into said first modular jack;
a second modular jack for receiving said first modular plug;
an electrical interconnection of said second modular jack with said second modular plug;
means connected to said interconnection for tapping said audio signal from said electrical interconnection of said second modular jack with said second modular plug; and
means connected to said tapping means for recording said tapped audio signal.

22. Apparatus as claimed in claim 21, wherein:
said tapping means include a voltage divider.

23. Apparatus as claimed in claim 21, including:
means connected to said tapping means for amplifying said tapped audio signal.

24. Apparatus as claimed in claim 21, including:
means connected to said interconnection for providing in said electrical interconnection an electric signal indicative of a removal of said handset from said housing;
means for connecting to said electrical interconnection said means for recording said tapped audio signal; and
means for actuating said recording means in response to said electric signal.

25. Apparatus as claimed in claim 21, including:
means connected to said interconnection for providing in said electrical interconnection an electric signal indicative of a removal of said handset from said housing;
a remote control in said recording means for selectively actuating said recording means;
means for providing an electric current for selectively actuating said remote control; and
means connected to said interconnection for employing said electric signal indicative of a removal of said handset to close an electric circuit for said electric current for selectively actuating said remote control.

26. Apparatus as claimed in claim 21, 24 or 25, including:
means for unifying said second modular jack, second modular plug and electrical interconnection into an integral unit.

27. Apparatus as claimed in claim 26, including:
means for releasably attaching said integral unit to said housing.

28. Apparatus as claimed in claim 21, 24 or 25, including:
a container for said second modular jack, and for at least part of said electrical interconnection and said tapping means.

29. Apparatus as claimed in claim 25, wherein:
said electric current providing means include means for providing said electric current for selectively actuating said remote control as a unidirectional electric current; and
said means for employing said electric signal include a semiconductive electric current conducting device connected to said remote control for controlling said unidirectional electric current and means for controlling said semiconductive device with said electric signal indicative of a removal of said handset.

30. Apparatus as claimed in claim 29, including:
a manually actuable switch at and connected to said semiconductive device for selectively reversing the polarity of said unidirectional electric current at said device.

31. Apparatus as claimed in claim 29 or 30, including:
means connected to said semiconductive device for unidirectionally conducting said unidirectional electric current past said semiconductive device for selectively deactivating a control of said semiconductive device with said electric signal indicative of a removal of said handset.

32. Apparatus as claimed in claim 21, including:
means for providing a luminous signal indicative of a removal of said handset from said housing; and
means connected to said recording means for actuating said recording means in response to said luminous signal.

33. Apparatus as claimed in claim 21, including:
means for providing a luminous signal indicative of a removal of said handset from said housing;
a remote control in said recording means for selectively actuating said recording means;
means for providing an electric current for selectively actuating said remote control; and
means connected to said remote control for closing an electric circuit for said electric current for selectively actuating said remote control in response to said luminous signal.

34. Apparatus as claimed in claim 33, wherein:
said electric current providing means include means for providing said electric current for selectively actuating said remote control as a unidirectional electric current; and
said closing means include an electrooptical semiconductive electric current conducting device connected to said remote control for controlling said unidirectional electric current and means for exposing said electrooptical semiconductive device to said luminous signal indicative of a removal of said handset.

35. Apparatus as claimed in claim 34, including:
a manually actuable switch at and connected to said semiconductive device for selectively reversing the polarity of said unidirectional electric current at said semiconductive device.

36. Apparatus as claimed in claim 34 or 35, including:
means connected to said semiconductive device for unidirectionally conducting said unidirectional electric current past said semiconductive device for selectively deactivating a control of said semiconductive device by said luminous signal indicative of a removal of said handset.

37. Apparatus as claimed in claim 29 or 34, including:
means for unifying said second modular jack, second modular plug, electrical interconnection and semiconductive device into an integral unit.

38. Apparatus as claimed in claim 37, including:
means for releasably attaching said integral unit to said housing.

39. Apparatus as claimed in claim 21, 24 or 32, including:
a balancing network in said telephone set for balancing a level of said audio signal emanating from an audio transmitter located in said handset and a level of said audio signal emanating from an audio transmitter remote from said telephone set;
said first modular jack, second modular plug and electrical interconnection constituting a means for connecting said tapping means to said balancing network.

40. Apparatus as claimed in claim 21, 24 or 32, including:
varistor means in said telephone set for equalizing a level of said audio signal emanating from an audio transmitter located in said handset and a level of said audio signal emanating from an audio transmitter remote from said telephone set;
said first modular jack, second modular plug and electrical interconnection constituting a means for connecting said tapping means to said varistor means.

* * * * *